(12) United States Patent
Hochstein et al.

(10) Patent No.: US 7,823,239 B2
(45) Date of Patent: Nov. 2, 2010

(54) ILLUMINATED LOADING DOCK SYSTEM

(75) Inventors: Al Hochstein, Milwaukee, WI (US); Kyle Nelson, Cedarburg, WI (US); Matt Sveum, Wauwatsoa, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 11/484,435

(22) Filed: Jul. 11, 2006

(65) Prior Publication Data

US 2008/0010758 A1 Jan. 17, 2008

(51) Int. Cl.
*E01D 1/00* (2006.01)

(52) U.S. Cl. .............................. 14/69.5; 14/71.1; 404/9

(58) Field of Classification Search ................. 14/69.5, 14/71.1; 404/6, 9, 11
See application file for complete search history.

(56) References Cited

U.S. PATENT DOCUMENTS

| | | | | |
|---|---|---|---|---|
| 4,843,373 A * | 6/1989 | Trickle et al. ................ | 340/540 |
| 4,973,016 A | 11/1990 | Hertenstein | |
| 5,137,391 A * | 8/1992 | Ballesteros .................... | 404/6 |
| 5,299,386 A * | 4/1994 | Naegelli et al. ................ | 49/28 |
| 5,333,339 A * | 8/1994 | Larsen ........................ | 14/71.1 |
| 5,396,676 A | 3/1995 | Alexander et al. | |
| 5,453,916 A * | 9/1995 | Tennis et al. ................. | 362/152 |
| 5,459,963 A * | 10/1995 | Alexander ...................... | 49/34 |
| 5,500,642 A * | 3/1996 | Battle ....................... | 340/932.2 |
| 5,564,238 A * | 10/1996 | Ellis ......................... | 52/173.2 |
| 5,586,355 A * | 12/1996 | Metz et al. ................... | 14/69.5 |
| 5,683,170 A * | 11/1997 | Blaha ......................... | 362/145 |
| 5,709,458 A | 1/1998 | Metz | |
| 6,065,852 A * | 5/2000 | Crumley ..................... | 362/146 |
| 6,079,157 A * | 6/2000 | Hincher, Sr. .................. | 49/57 |
| 6,082,877 A * | 7/2000 | Hughes ....................... | 362/360 |
| 6,502,268 B2 | 1/2003 | Ashelin et al. | |
| 6,634,139 B1 * | 10/2003 | Metz .............................. | 49/13 |

(Continued)

FOREIGN PATENT DOCUMENTS

DE 1772370 8/1958

(Continued)

OTHER PUBLICATIONS

European Patent Office, "PCT International Search Report," issued by the European Patent Office on Dec. 6, 2007, in connection with a counterpart international application No. PCT/US2007/072906, (4 pages).

(Continued)

*Primary Examiner*—Raymond W Addie
(74) *Attorney, Agent, or Firm*—Hanley, Flight & Zimmerman, LLC

(57) ABSTRACT

An illuminated loading dock system includes a series of light fixtures having sufficient power to illuminate the interior of a series of trailers from a distance that spans a dock leveler pit. The light fixtures are mounted to stanchions (or a railing thereof) that extend upward from an elevated floor that is higher than the pit's floor. In some cases the light fixtures are coupled to control panels that control the operation of the dock levelers. In this arrangement, the pit floor is kept clear of clutter, and dockworkers can control the lights and the dock leveler from one safe location, as opposed to having to step down into the pit, underneath a raised dock leveler deck.

3 Claims, 2 Drawing Sheets

U.S. PATENT DOCUMENTS

| | | | |
|---|---|---|---|
| 6,781,516 B2 * | 8/2004 | Reynard et al. | 340/686.1 |
| 6,812,849 B1 * | 11/2004 | Ancel | 340/686.1 |
| 6,916,103 B2 * | 7/2005 | Currie et al. | 362/145 |
| 7,088,284 B2 * | 8/2006 | Young | 342/27 |
| 7,101,064 B2 | 9/2006 | Ancel | |
| 2003/0151912 A1 | 8/2003 | Ancel | |
| 2005/0102041 A1 | 5/2005 | Duvernell et al. | |
| 2005/0211389 A1 * | 9/2005 | Snyder et al. | 160/23.1 |
| 2006/0137261 A1 * | 6/2006 | Maly | 52/36.3 |
| 2007/0068079 A1 * | 3/2007 | Morgan et al. | 49/49 |

FOREIGN PATENT DOCUMENTS

| | | |
|---|---|---|
| EP | 0017620 | 10/1980 |

OTHER PUBLICATIONS

European Patent Office, "PCT Written Opinion of the International Searching Authority," issued by the European Patent Office on Dec. 6, 2007, in connnection with a counterpart international application No. PCT/US2007/072906, (6 pages).

Kelley Company, Inc., Brochure for Loading Dock Accessories, Internet Web Site of Kelley Company, Inc., archived Jan. 28, 2008, last updated in 1983 (1 page).

The International Bureau, "International Preliminary Report on Patentability," issued in connection with counterpart international application No. PCT/US2007/072906, mailed Jan. 22, 2009, 7 pages.

The International Bureau, "International Preliminary Report on Patentability," issued in connection with international application No. PCT/US2007/072910, mailed Jan. 22, 2009, 9 pages.

International Searching Authority, "International Search Report," issued in connection with international application No. PCT/US2007/072910, mailed Dec. 6, 2007, 4 pages.

International Searching Authority, "Written Opinion," issued in connection with international application No. PCT/US2007/072910, mailed Dec. 6, 2007, 4 pages.

Rite-Hite Holding Corporation, "HD-VHL Vertical Storing Dock Levelers," published 2004, 2 pages.

Australian Intellectual Property Office, "Examiner's First Report," issued in connection with Australian application serial No. 2007272681, mailed Apr. 16, 2010, 1 page.

Canadian Intellectual Property Office, "Office Action," issued in connection with Canadian application serial No. 2,657,377, issued Mar. 12, 2010, 2 pages.

United States Patent and Trademark Office, "Notice of Allowance," issued in connection with U.S. Appl. No. 11/484,413, mailed Jan. 15, 2009, 8 pages.

United States Patent and Trademark Office, "Notice of Allowance," issued in connection with U.S. Appl. No. 11/484,413, mailed Oct. 10, 2008, 6 pages.

United States Patent and Trademark Office, "Notice of Allowance," issued in connection with U.S. Appl. No. 11/484,413, mailed Jul. 2, 2008, 4 pages.

United States Patent and Trademark Office, "Non-Final Office Action," issued in connection with U.S. Appl. No. 11/484,413, mailed Mar. 20, 2008, 7 pages.

European Patent Office, "Office Communication," issued in connection with European application No. 05 704 885.2, mailed Apr. 21, 2009, 3 pages.

Australian Patent Office, "Office Communication," issued in connection with Australian application serial No. 2007272681, issued Jul. 27, 2010, 1 page.

* cited by examiner

ILLUMINATED LOADING DOCK SYSTEM

FIELD OF THE DISCLOSURE

The present disclosure generally pertains to loading docks and more specifically to an illuminated loading dock system.

BACKGROUND

A typical loading dock of a building includes an exterior doorway with an elevated platform for loading and unloading vehicles, such as trucks and trailers. To compensate for height differences between the loading dock platform and an adjacent bed of a truck or trailer, many loading docks have a dock leveler. A typical dock leveler includes a deck or ramp that is pivotally hinged along its back edge to vary the height of its front edge. An extension plate or lip extends outward from the deck's front edge to span the gap between the rear of the truck bed and the front edge of the deck.

The deck is usually moveable between a stored position and an operative position. Depending on the style of dock leveler, the deck may store either vertically or horizontally. U.S. Pat. No. 6,502,268 shows an example of a horizontally storing deck, and U.S. Pat. No. 5,396,676 discloses a dock leveler with a vertically storing deck. In either case, the lip in the operative position extends from the deck's front edge and rests upon the trailer bed to form a bridge between the two. This allows personnel and material handling equipment to readily move on and off the vehicle during loading and unloading operations.

If the truck or trailer is enclosed, as opposed to being an open flat bed trailer, the inside of the trailer can be quite dark, making it difficult to see deep inside the trailer. So, articulated light fixtures pointing into the trailer are often installed near the doorway of building. But since these fixtures protrude into the doorway, they can interfere with the operation of the door and are susceptible to being struck by forklifts entering and leaving the trailer. Moreover, when such fixtures are used with vertically storing dock levelers, the deck with its broad sweeping motion might tear the fixture completely off its mounting base. Although light fixtures can be floor mounted, such an installation can create clutter in an otherwise clear dock pit that accommodates a series of side-by-side dock levelers.

Consequently, a need exists for a better way of illuminating the inside of a plurality of trailers at loading dock that has a series of vertically storing dock levelers.

SUMMARY

In some examples, a lighting system includes a plurality of light fixtures mounted to a plurality of stanchions so that light can be projected above and beyond the dock pit and into the cargo bay of a plurality of trailers without having to add clutter to the pit floor.

In some examples, the lighting system is coupled to a dock leveler's control panel to minimize wiring and to enable a dockworker to control both the dock leveler and the lighting system from one safe location, whereby the dockworker is not required to step down into the pit, underneath a raised deck.

DETAILED DESCRIPTION

Figure 1:
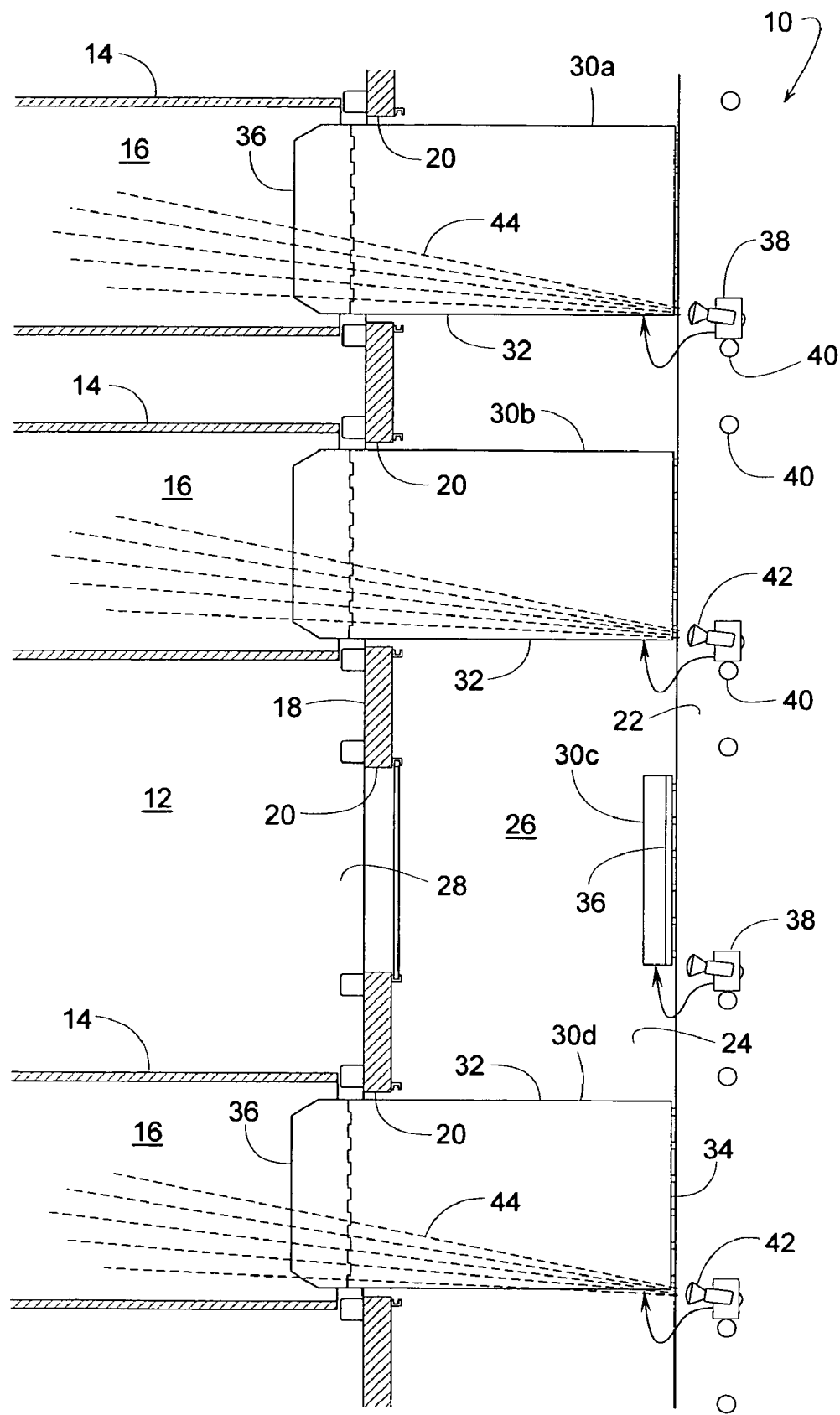
FIG. 1 is a top view of a loading dock with plurality of vertically storing dock levelers and a lighting system for illuminating a plurality of vehicles at the dock.
Figure 2:
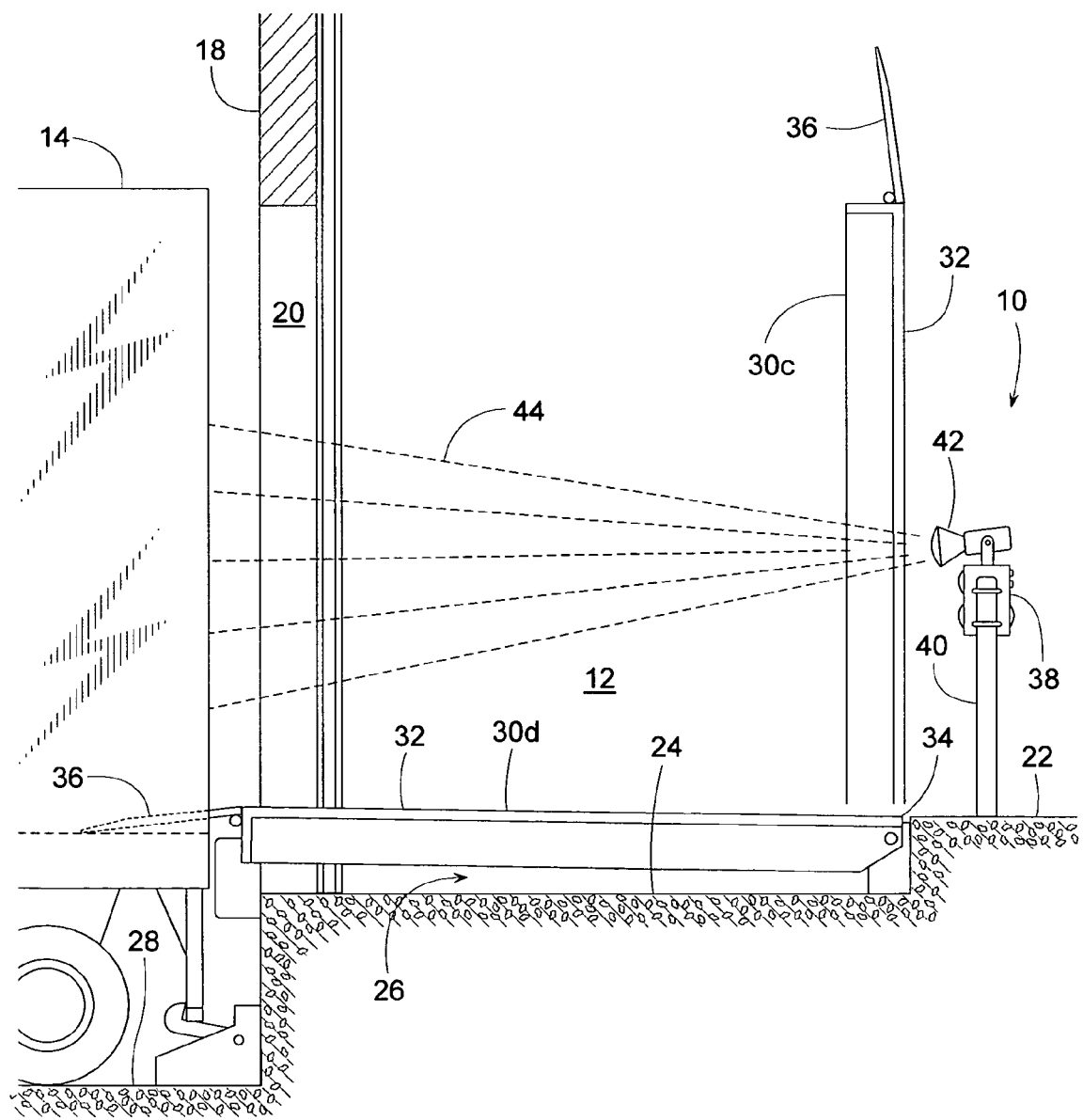
FIG. 2 is a side view of the installation shown in FIG. 1.

FIGS. 1 and 2 illustrate an example lighting system 10 for a loading dock 12 that facilitates the loading and unloading of a plurality of vehicles 14 each of which has a cargo bay 16 such as an enclosed trailer.

Loading dock 12 includes an exterior wall 18 defining a plurality of doorways 20, an elevated floor 22 inside the building, a pit floor 24 defining the bottom of a pit 26, and a driveway 28 that vehicles 14 use to approach doorways 20. Pit floor 24 is higher than the adjacent portion of driveway 28, and elevated floor 22 is higher than pit floor 24. Pit floor 24 may be uncluttered to make it easier to periodically clean the pit.

A plurality of dock levelers 30a-d are disposed in side-by-side relation to each other within pit 26. Each dock leveler 30a-d includes a deck 32 that is hinged at a rear edge 34 so that deck 32 can pivot between a generally vertical stored position (e.g., leveler 30c) and a generally horizontal operative position (e.g., levelers 30a, 30b, and 30d). In the operative position, a lip 36 of deck 32 rests upon the bed of the trailer, while rear edge 34 remains generally flush with elevated floor 22. In this position, the dock leveler provides a bridge for dockworkers and material handling equipment to travel between elevated floor 22 and vehicle 14. While this example shows a dock light for use with such vertically—storing levelers, the disclosure in adaptable to other styles of leveler as well.

The pivotal motion of deck 32 can be driven by various mechanisms well known to those of ordinary skill in the art. A control panel 38 can be wired or otherwise operably coupled to dock levelers 30a-d to actuate their deck-pivoting mechanisms.

To create a barrier that helps prevent pedestrians and vehicles from falling into pit 26, a plurality of barriers in the form of stanchions 40 (with or without railings) extend upward from elevated floor 22. Other barriers or means of mounting them adjacent the leveler are also possible.

To illuminate the interior of vehicles 14, a plurality of light fixtures 42 are supported by the plurality of stanchions 40. Light fixtures 42 are adjustable so they can be aimed to project a light 44 above and beyond pit 26 and through the plurality of doorways 20 for illuminating the cargo bay of the plurality of vehicles 14. In some cases, control panels 38 can be supported by stanchions 40, and light fixtures 42 can be attached to control panels 38. This minimizes wiring and allows the lights and dock levelers to be controlled from the same safe location, thus a dockworker does not have to step down into pit 26 to activate the lights. Moreover, pit floor 24 can be kept clear of floor-mounted light fixtures. Placement of the dock lights in a safe position generally behind the leveler 30 also eliminates the possibility of the light being struck or damaged by a forktruck as it enters or exits the trailer, since it no longer projects physically into the trailer opening.

It will be appreciated by persons of ordinary skill in the art that modifications to the above disclosed examples may be. For example, the positioning of light 42 relative to the control panel 38 or stanchion 40 may be different than depicted. Indeed, the light 42 may even be mounted independently of control panel 38, although typically wired thereto. Therefore, although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

The invention claimed is:

1. An illuminated loading dock system for loading and unloading vehicles having cargo bays while the vehicles are parked adjacent a loading dock that includes a wall defining a doorway, an elevated floor, and a pit disposed between the doorway and the elevated floor such that the elevated floor is spaced away from the doorway, wherein the elevated floor is higher than a pit floor, the system comprising:

a dock leveler including a deck with a front edge adjacent the doorway and a rear edge adjacent the elevated floor and about which the deck is pivotal between a generally vertical stored position and a generally horizontal operative position;

a barrier disposed adjacent the rear edge of the deck and remotely from the doorway and extending upward from the elevated floor to create a barrier between the elevated floor and an adjacent area of the pit; and a light fixture supported by the barrier, wherein the light fixture is aimed to project light above and beyond the pit and through the doorway for illuminating the cargo bay of a vehicle positioned at the dock.

2. The illuminated loading dock system of claim 1, further comprising a control panel supported by the barrier, wherein the control panel is operably coupled to the dock leveler to control the operation thereof, and wherein the light fixture is coupled to the control panel.

3. The illuminated loading dock system of claim 1, wherein the barrier comprises a stanchion.

* * * * *